UNITED STATES PATENT OFFICE.

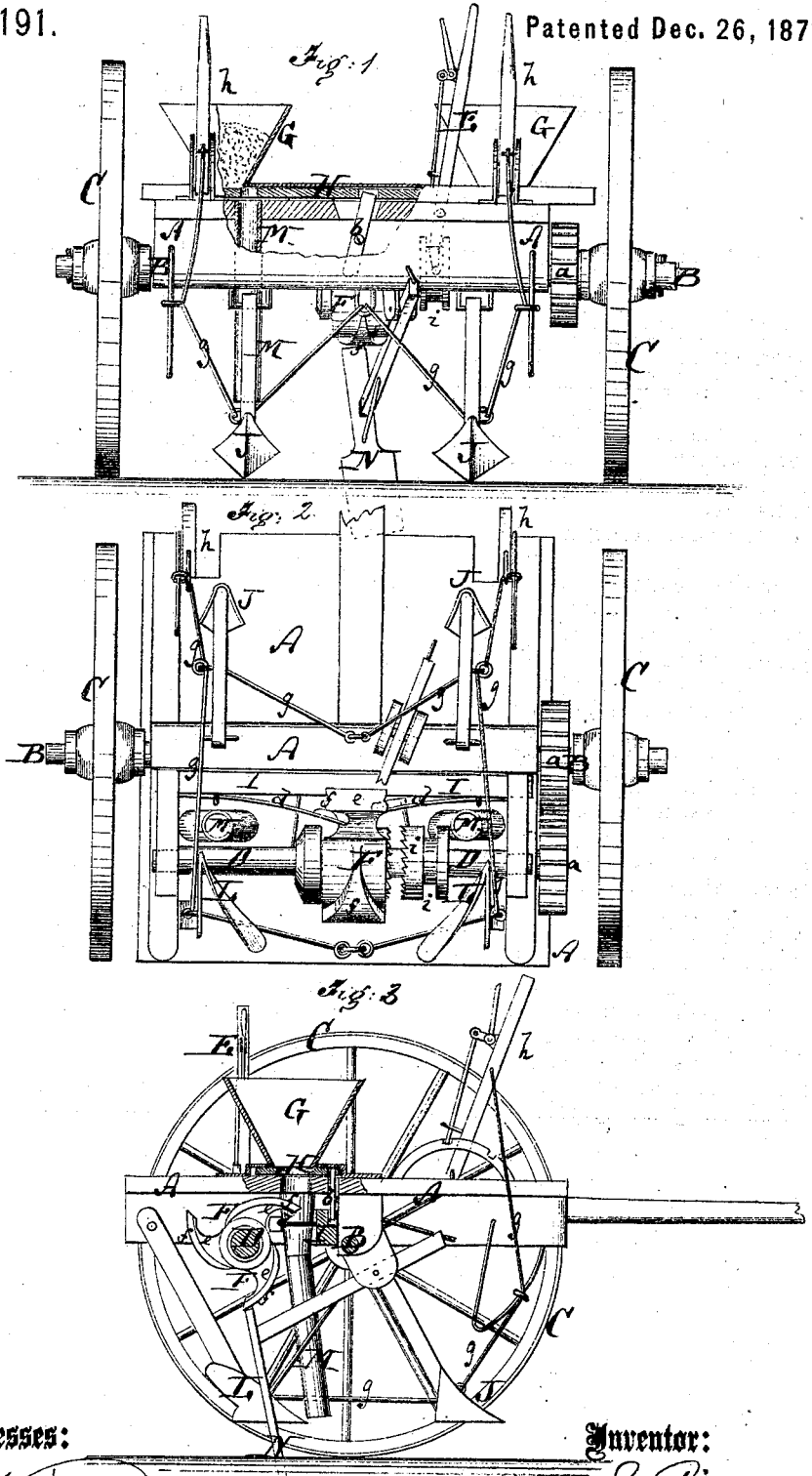

JOSEPH PIES, OF SPARLAND, ILLINOIS.

IMPROVEMENT IN CORN-PLANTERS.

Specification forming part of Letters Patent No. 122,191, dated December 26, 1871.

Specification describing a new and Improved Corn-Planter, invented by JOSEPH PIES, of Sparland, in the county of Marshall and State of Illinois.

Figure 1 represents a front elevation of my improved corn-planter. Fig. 2 is a bottom view of the same. Fig. 3 is a vertical longitudinal section of the same.

Similar letters of reference indicate corresponding parts.

This invention relates to a new corn-planter, which is entirely self-acting and double, and which prepares its own furrows, deposits the corn in proper succession, and covers it when in the ground. The invention consists in a new general arrangement of parts, hereinafter more fully described.

A in the drawing represents the frame-work of the corn-planter. It is supported by an axle, B, whose ends rest in wheels C C. The axle revolves with the wheels whenever the machine is drawn ahead by animals hitched to its front. D is a horizontal shaft hung in the frame A back of the axle B. It is, by gear-wheels $a\ a$, connected with the axle B, to be revolved by the same. A clutch, $i$, on the shaft D can be moved by means of a lever, E, to throw a spider, F, into or out of gear. On the frame are supported two seed-hoppers, G G, which contain the corn to be dropped. H is the perforated seed-slide placed across the frame A so as to reach under both hoppers and bring an aperture under each in proper succession when moved to and fro. A pin, $b$, connects the seed-slide H with another transverse slide, I, under the frame A. Two spring-arms, $d\ d$, are formed on the slide I, and project toward each other so as to be within reach of the spider F. This latter has three, more or less, curved arms, $e\ e$, of which each carries a triangle, $f$, on the extremity. The edge of one triangle serves to throw one arm $d$ to one side, whereupon the triangle upon the next spider-arm acts similarly upon the other arm $d$, and so forth, thus imparting reciprocating motion to the slide I. The slide I transmits its movement by the connection $b$ to the seed-slide H. J J are the furrow-openers, and L L the furrow-closers, pivoted to the under side of the frame A, and connected by rods $g\ g$ and with levers $h\ h$, so that they can be raised and lowered by the latter. M M are the seed drop-tubes. N is a marker to insure the proper advance of the apparatus in the desired direction.

Having thus described my invention, I claim as new and desire to secure by Letters Patent—

The combination of the rotary spider F having the triangles $f\ f$, with the spring-arms $d\ d$, slide I, and seed-slide H, all arranged to operate substantially as herein shown and described.

JOSEPH PIES.

Witnesses:
LEWIS W. BATES,
DAVID HAMILTON.

(133)